United States Patent
Seibold et al.

(10) Patent No.: US 9,809,395 B2
(45) Date of Patent: Nov. 7, 2017

(54) METHOD FOR CONTROLLING A MATERIAL FLOW SYSTEM

(71) Applicant: Karlsruher Institut fuer Technologie, Karlsruhe (DE)

(72) Inventors: Zaezilia Seibold, Karlsruhe (DE); Kai Furmans, Waldbronn (DE); Marco Gebhardt, Sinsheim (DE); Thomas Stoll, Ettlingen (DE)

(73) Assignee: Karlsruher Institut fuer Technologie, Karlsruhe (DE)

( * ) Notice: Subject to any disclaimer, the term of this patent is extended or adjusted under 35 U.S.C. 154(b) by 70 days.

(21) Appl. No.: 15/072,390

(22) Filed: Mar. 17, 2016

(65) Prior Publication Data
US 2016/0272436 A1    Sep. 22, 2016

(30) Foreign Application Priority Data
Mar. 17, 2015    (DE) .................. 10 2015 003 381

(51) Int. Cl.
| | | |
|---|---|---|
| *B65G 43/10* | (2006.01) | |
| *G06Q 10/08* | (2012.01) | |
| *G06Q 50/28* | (2012.01) | |

(52) U.S. Cl.
CPC ............. *B65G 43/10* (2013.01); *G06Q 10/08* (2013.01); *G06Q 50/28* (2013.01)

(58) Field of Classification Search
None
See application file for complete search history.

(56) References Cited

U.S. PATENT DOCUMENTS

| | | | |
|---|---|---|---|
| 2008/0086236 A1* | 4/2008 | Saito .................. | G01S 5/0252 700/245 |
| 2012/0004766 A1 | 1/2012 | Stoll et al. | |

(Continued)

FOREIGN PATENT DOCUMENTS

| | | |
|---|---|---|
| DE | 102008059529 A1 | 6/2010 |
| DE | 102009031137 A1 | 10/2010 |
| DE | 102009033600 A1 | 10/2010 |

OTHER PUBLICATIONS

Dipl.-Ing. Stephan H. Mayer, "Development of a completely decentralized control system for modular continuous conveyors", Dissertation, Wissenschaftliche Berichte des Institutes für Fördertechnik und Logistiksysteme der Universität Karlsruhe (TH), Band 73, Apr. 1, 2009, pp. 1-146.

(Continued)

*Primary Examiner* — Yolanda Cumbess
(74) *Attorney, Agent, or Firm* — Leydig, Voit & Mayer, Ltd.

(57) ABSTRACT

A method for controlling a material flow system, wherein the material flow system includes vehicles for transporting goods packages, wherein the vehicles communicate autonomously among one another in the material flow system, wherein the vehicles move by movement steps along a material flow path from a starting node to a target node, and wherein a logical clock is associated with each node. The method includes providing each movement step of a first vehicle with a time stamp, carrying out movement steps such that for the first vehicle, successive movement steps assume monotonically increasing values for the time stamp, and for each node that is traversed, providing an outgoing movement step of the first vehicle with value of a time stamp which is less than or equal to a value of a time stamp for a subsequently incoming movement step of a second vehicle.

10 Claims, 4 Drawing Sheets

(56) References Cited

U.S. PATENT DOCUMENTS

2012/0024666 A1\* 2/2012 Baier ................. G05B 19/4189
　　　　　　　　　　　　　　　　　　　　　　198/571
2012/0029689 A1　　2/2012 Baier et al.
2012/0029869 A1\* 2/2012 Muensterer ............. G01S 7/411
　　　　　　　　　　　　　　　　　　　　　　702/155

OTHER PUBLICATIONS

Leslie Lamport, "Time, Clocks, and the Ordering of Events in a Distributed System", Communications of the ACM, vol. 21, No. 7, Jul. 1978, pp. 558-568.

\* cited by examiner

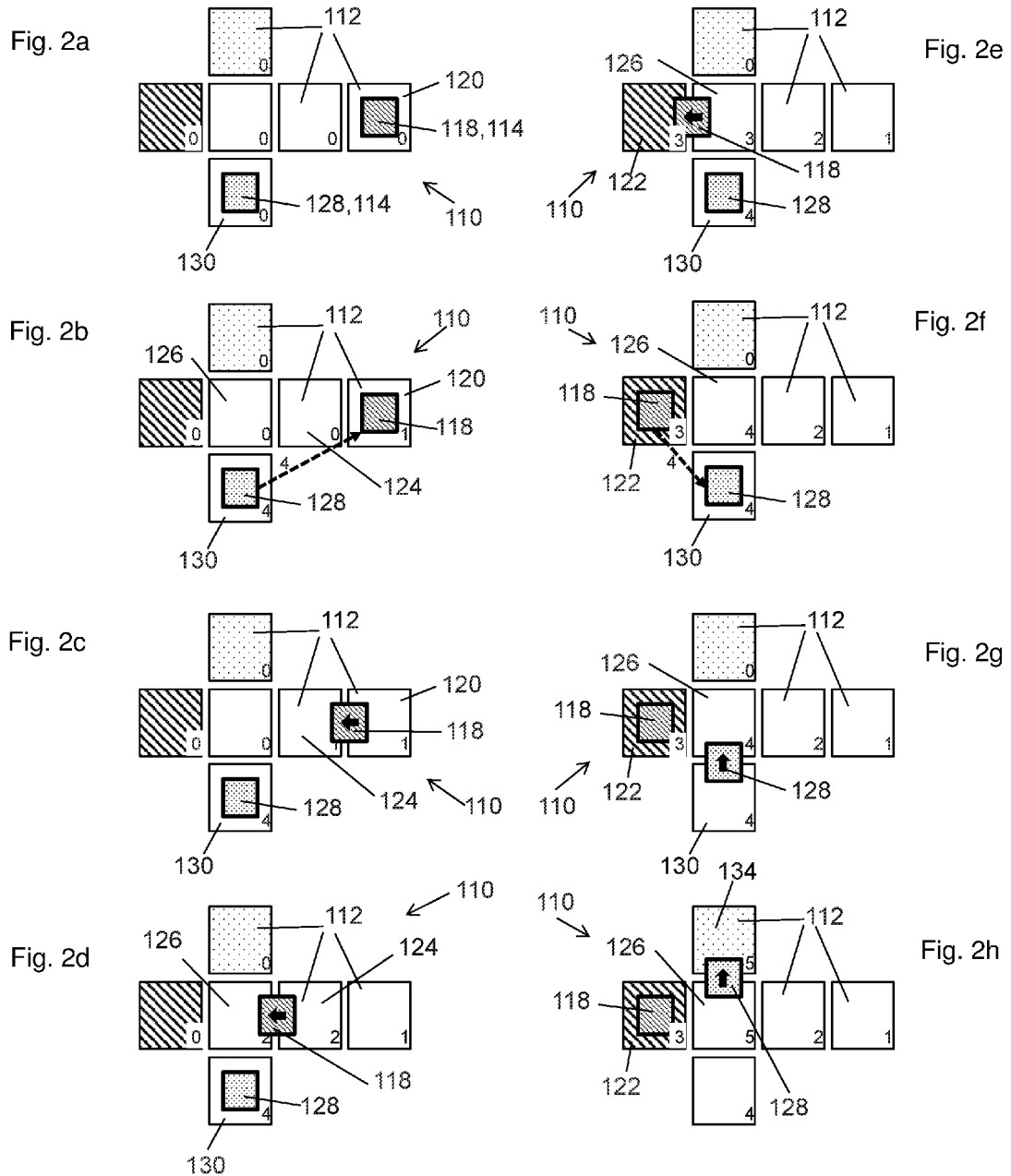

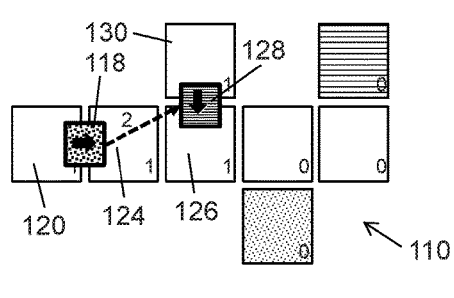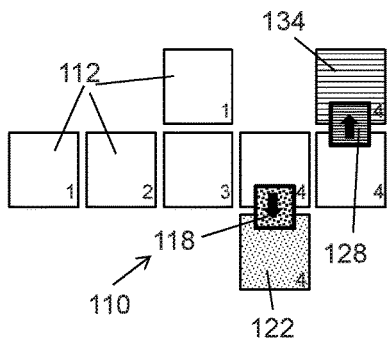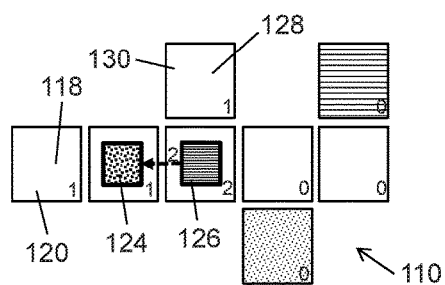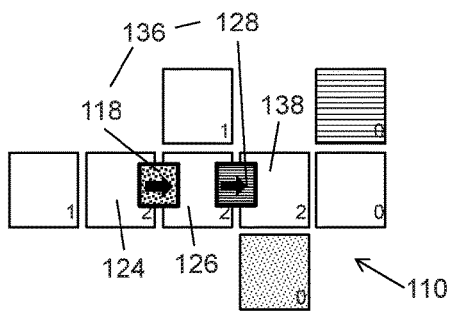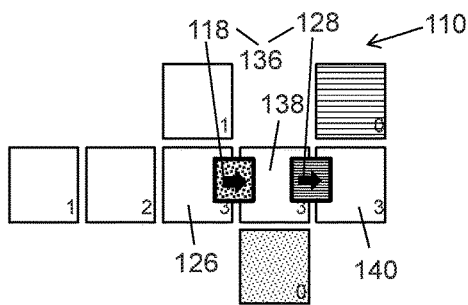

METHOD FOR CONTROLLING A MATERIAL FLOW SYSTEM

CROSS REFERENCE TO RELATED APPLICATIONS

This application claims benefit to German Patent Application No. DE 10 2015 003 381.6, filed Mar. 17, 2015.

FIELD

The invention relates to a method for controlling a material flow system, the material flow system including vehicles configured to transport goods packages.

BACKGROUND

Recent developments, such as e-commerce or an increasingly desired individualisation of products, require the introduction of complex material flow systems, in particular to be able to meet the demands of the intralogistics sector which have increased as a result. Therefore, material flow systems are desirable which can be adapted as flexibly as possible to changing conditions, without thereby losing efficiency. Fundamental tasks which should be performed by material flow systems of this type in the intralogistics sector include, in particular, the transportation, assembly, sorting, and intermediate storage of goods packages. So-called "plug-and-work" material flow systems are used, in particular, those which have a decentralised control of the individual modules in order to allow as flexible an adaptation as possible of the material flow system to changing conditions.

A material flow system of this type is the so-called "FlexConveyor" which is known, for example, from DE 10 2008 059 529 A1. It comprises a material flow system which is controllable in a decentralised manner and has a plurality of preferably identical modules for the transportation of goods packages, the individual modules being easily assembled and detached from one another to thus be able to provide a material flow system which meets the respective requirements. The material flow system described in the mentioned document allows the transportation of goods packages by transport steps along a material flow path, from a starting module to a target module. Here, any module of the material flow system can be used as the starting module or as the target module, so that under a decentralised control, the proposed material flow system can perform complex transportation tasks involving a plurality of goods packages which can be conveyed from various starting modules to different target modules. Further material flow systems are disclosed in DE 10 2009 031 137 A1 and in DE 10 2009 033 600 A1.

Zaezilia Seibold, Thomas Stoll and Kai Furmans, *Layout-optimized sorting of goods with decentralized controlled conveyor modules*, Systems Conference (SysCon), 2013, IEEE International, p. 628-633, 2013, describes, in addition to the above-mentioned "FlexConveyor," a further material flow system, also known as a "GridSorter." The so-called "GridSorter" comprises, in particular, an area, which is as cohesive as possible, of modules which are preferably arranged in a rectangular shape. Since, by virtue of this arrangement, the size and shape of the material flow system as well as the positions of starting modules and target modules can be freely selected within wide limits, this device has a high degree of flexibility so that it can adapt to the respective demands and general conditions of its use, particularly in the intralogistics sector.

The "GridSorter" has a continuous process, running in the background, of independent layout detection, which is particularly configured to detect possible changes in layout, for example due to the breakdown of individual modules.

In addition to preventing collisions between different goods packages which are transported at the same time in the material flow system, a control means in the material flow system should be configured in such a way to prevent so-called "deadlocks." The term "deadlock" in this context can describe a state of a goods package in which said goods package is within a loop in the material flow system and therefore cannot arrive at the desired target module. According to Stephan H. Mayer, in *Development of a completely decentralized control system for modular continuous conveyors*, Wissenschaftliche Berichte des Institutes für Fördertechnik and Logistiksysteme der Universitat Karlsruhe (TH), Vol. 73, Editor Prof. Dr. Ing. Kai Furmans, Universitätsverlag Karlsruhe, 2009, chapter 4.2.3, pages 69-75, the risk of deadlocks can be reduced by reserving the entire material flow path from the starting module to the target module before the goods package is actually transported in the associated material flow system.

This dissertation investigates the extent to which a discrete reservation of modules can be advantageous. In this case, each module involved would only be reserved for a particular time frame in which the arrival of the goods package was expected. Here, a deadlock situation could be avoided in that one reservation in each case for all involved modules from the starting module to the target module could be made in each case for particular time frames. However, the author does not pursue this approach further, because he assumes that in the event that a plurality of goods packages is simultaneously present in the material flow system, he estimates that it is very likely that the expected arrival times cannot be guaranteed due to mutual obstructions of the goods packages at interfaces and therefore the time frames would always have to be moved. In particular, to avoid deadlock situations, he assumes that the modules would be forced to permanently adapt their time frames to the actual arrival times and accordingly to update the reservations which have already been made. This would significantly increase the expense in terms of calculation time and data transmission which is required for this purpose, as a result of which he fears that substantial restrictions would arise in the scalability of the material flow system which is controlled in this way.

In the intralogistics sector, so-called shuttle storage systems have been used to an increasing extent for some years which make it possible to achieve an increased throughput, compared to conventional automated storage systems which have one stacker crane per storage aisle. In the shuttle stores, the individual vehicles (shuttles) can move on defined pathways (material flow paths). A shuttle (vehicle) can change the predefined pathway (storage aisle, material flow path) or not, depending on the configuration. The vehicles (shuttles) either remain in a storage aisle or on storage racking levels (material flow path) or they can change the racking levels by means of a mechanical device, for example a lift. The efficiency of a storage system increases with the number of vehicles (shuttles), provided that the control means ensures that as few waiting times as possible and/or that no deadlocks occur as a result. The following publication Rotgeri M, Dieckerhoff M, ten Hompel M (2014), *Vergleich von additiv and herkömmlich gefertigten Strukturen für ein neuartiges Regalfahrzeug*, Logistics Journal: Proceedings, Vol. 2014, discloses a novel storage and retrieval vehicle which can also automatically change the racking levels. Formed in the storage aisle is a close network of defined paths on which vehicles can move as required. A control means for the routing of a shuttle storage system of this type does not form part of the article. A decentralised control concept for an electric monorail conveyor is disclosed by Chisu, Razvan, Florian Kuzmany, and Willibald A. Günthner in "Realisierung einer agentenbasierten Steuerung für Elektrohängebahnsysteme" Internet der Dinge in der Intralogistik. Springer Berlin Heidelberg, 2010. 263-274. Common to these electric monorail conveyor systems and a shuttle storage system is the fact that that they are track-guided. However, the route network is not as close as in the described shuttle storage system. The publication "Wandelbare automatisierte Materialflusssysteme für dynamische Produktionsstrukturen", Fördertechnik—Materialfluss—Logistik, Wilke, Michael (2006) discloses a control means of a system in which the vehicles can automatically make route reservations which they store in a central area which can be accessed by all vehicles. Deadlocks due to circular layouts are not considered further because they do not occur with the considered number of vehicles and with the type of route network.

SUMMARY

In an embodiment, the present invention provides a method for controlling a material flow system, wherein the material flow system includes vehicles for transporting goods packages, wherein the vehicles communicate autonomously among one another in the material flow system, wherein the vehicles move by movement steps along a material flow path from a starting node to a target node, wherein each movement step of a vehicle comprises movement from a first node to a second node, and wherein a logical clock is associated with each node. The method includes providing each movement step of a first vehicle with a time stamp; and carrying out movement steps such that for the first vehicle, successive movement steps assume monotonically increasing values for the time stamp and such that for each node that is traversed, an outgoing movement step of the first vehicle has a value of the time stamp which is less than or equal to a value of a time stamp for a subsequently incoming movement step of a second vehicle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 2a-2h show a schematic view of a movement process in a method according to an embodiment of the invention for controlling a material flow system;

FIGS. 4a-4e show a schematic view of a second movement process in a method according to an embodiment of the invention for controlling a material flow system.

DETAILED DESCRIPTION

Figure 1A:
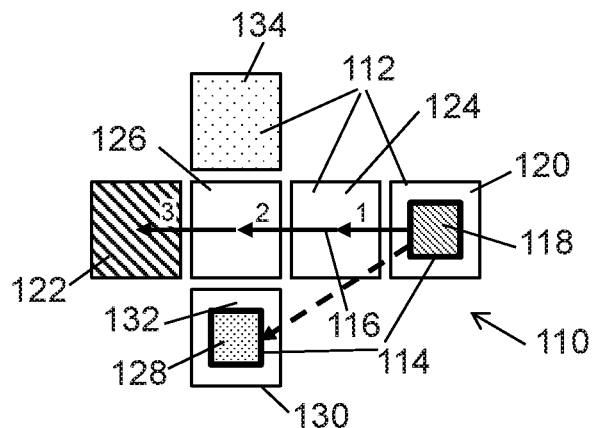
FIGS. 1a-1c show a schematic view of a first reservation process in a method according to an embodiment of the invention for controlling a material flow system.

According to an embodiment, the present invention provides a method for controlling a material flow system, said material flow system having vehicles which are to transport goods packages and can move along material flow paths, which method at least partly overcomes disadvantages and restrictions of the prior art.

In particular, the method according to an embodiment of the invention can configure the control of the material flow system such that certain problems and restrictions of the identified prior art do not occur during the operation of the material flow system.

In particular, a method according to an embodiment of the invention allows a control of vehicles with and without goods packages, which control is as efficient and as deadlock-free as possible and which is configured such that an interaction of the vehicles is prone to as few problems as possible in order to allow a coordinated material flow of the goods packages across the entire material flow system even for relatively long periods of time.

Thus, an embodiment of the present invention relates to a method for controlling a material flow system, said material flow system having vehicles for transporting goods packages, which vehicles move along at least one material flow path. Here, the terms "vehicle" or "shuttle" are understood as a structure within the material flow system which is configured to pick up or deliver or transport a goods package. Accordingly, the "vehicle" or "shuttle" is configured to perform movement steps from one particular node to a second particular node on a material flow path. To be able to perform this task, each node is connected to at least one adjacent node (neighbouring node), the connection being configured such that, in one movement step, a particular vehicle can travel to the node, a so-called "incoming movement" and, after a particular amount of time, in a second movement step, it can move away from the node, a so-called "outgoing movement."

In a preferred embodiment, the node and the connection to the neighbouring nodes are configured such that a so-called "tandem movement" can be carried out. The term "tandem movement" at a considered node can be understood as meaning that one vehicle can perform an outgoing movement away from the node and a second vehicle can perform an incoming movement to the node. The tandem movement has a considerable advantage, because at the considered node, a second vehicle can move in while the first vehicle moves away, without the considered node having to remain unoccupied for an interim period.

To be able to perform the tasks which it is set with, the vehicle can be equipped on the one hand with actuators for moving along and for picking up and delivering goods packages and, on the other hand, it can be equipped with sensors for detecting its own position in the surroundings. In particular, each vehicle can have its own control means which controls the movement taking place across the individual nodes, and also processes requests and, based on the response to the requests, can make appropriate decisions. For this purpose, the vehicles of the material flow system communicate autonomously among one another, one embodiment being preferred in which a relevant vehicle can communicate as directly as possible with as far as possible all the other vehicles by way of an appropriate communication device. In this way, on the one hand a central communication point is not required and, on the other hand, the technical expense required for communication within the material flow system is minimised as much as possible. The term "material flow system" is understood as meaning a system which allows the movement of vehicles across individual nodes provided in the material flow system.

The individual nodes can be connected in any form, even virtually, each node having at least one neighbouring node. For this purpose, in the material flow system there are three types of node which differ in function, without thereby requiring a different technical or virtual construction. Each vehicle moves along a material flow path, proceeding from a "starting node". The vehicle in the material flow system moves along the material flow path until it finally reaches a "target node".

The vehicle can move with or without a goods package. A vehicle usually moves to a first node (starting node) where it picks up a goods package and then it finally moves to a second node (target node) where it delivers the goods package. The other nodes of the material flow system which do not have the function of the starting node or the function of the target node are arranged between the starting node and the target node of the material flow system and, since they are capable of moving the vehicles along, they are also known as the material flow path or alternatively as "carriageways".

A topology of the material flow system which results from the mentioned nodes and from their relative spatial arrangement in the material flow system can be recorded in a so-called "adjacency matrix." Here, each vehicle of the material flow system can enquire about the topology of the material flow system by its own movement in the material flow system and through communicating with the other vehicles involved in the material flow system and, in this way, it can itself create the adjacency matrix.

In a particularly preferred embodiment, the vehicles and the nodes of the material flow system are configured such that the vehicles can move in all three spatial directions. In particular, due to this type of configuration, the nodes can be arranged in the material flow system such that a vehicle, starting from one node, can move in up to eight directions. Here, it is advantageous that the nodes form a network which is as close and cohesive as possible. In this way, the system can have a relatively high flexibility, particularly because the material flow path of a particular vehicle can be selected from a plurality of options.

In particular, due to the control of the material flow system according to the method of the invention, it is possible to use, as efficiently as possible, the material flow paths (carriageways), formed by the nodes for transporting goods to thus carry out the movement steps within the shortest possible time in a robust manner and particularly while avoiding deadlocks. Here, the term "robust" denotes a characteristic of the control of the material flow system in which the number of occurrences of errors, such as waiting times and/or deadlocks in the material flow system is as low as possible.

The present method for controlling the material flow system is suitable for transporting a plurality of types of goods packages by means of vehicles. These packages include unpackaged goods, goods provided with a packaging and/or an outer packaging and/or goods which are arranged, individually or together with further goods, on a substrate, for example on a pallet, in an unpackaged, packaged and/or unpackaged state.

In particular, to facilitate the detection of the goods packages, it is advantageous if the goods package has an identifier, for example in the form of a one-dimensional or two-dimensional code, for example a barcode or a data matrix code. Further codes suitable for this purpose include QR codes, Electronic Data Interchange (EDI) codes, Radio-Frequency Identification (RF ID) codes, Serial Shipping Container Codes (SSCC) or further identifiers.

In particular to ensure that the goods package passes from the selected starting node to the desired target node, the vehicles have communication with an external system, said external system being configured to preset the nodes at which the selected goods package is to be picked up and delivered. As already stated, each movement step of a vehicle has an outgoing movement from a first node which is taking part in the relevant movement, and an incoming movement of the vehicle to a second node, also taking part in the relevant movement.

According to an embodiment of the invention, each movement step of the vehicle is provided with a time stamp. Here, every incoming movement and every outgoing movement is known as an "event" which is consequently provided with one of the time stamps. The term "time stamp" is understood as meaning a relationship between the movement step and a sequential element of a monotonically increasing sequence.

The sequence of natural numbers 1, 2, 3 . . . , is used here as the monotonically increasing sequence, although basically all monotonically increasing sequences are suitable for this purpose, provided that a particular sequential element of the sequence has a higher value than a preceding sequential element of the sequence. Here, the choice of numbers, whether they belong to the decimal system or to another number system, such as the hexadecimal system is unimportant. Accordingly, the discrete time stamp is any numerical value, the absolute amount of which is insignificant, and it is possible to produce a partial order in a distributed system, as presented by the material flow system present here consisting of individual vehicles, by the respective value of the time stamp.

The so-called "logical clocks" concept presented by Leslie Lamport in Time, Clocks and the Ordering of Events in a Distributed System, *Communications of the ACM* 21.7, pages 558-565, 1978 can introduce a partial course of events in a distributed system, without having to resort to the physical time which prevails in this system and is fixed externally by a measure of time in seconds, fractions or multiples thereof. On this basis, associated with each node in the material flow system is a logical clock, which can be understood as meaning a counter which only moves forwards and thus performs a time step.

According to definition, a logical clock can in principle only assume the value which exceeds the value already present in the counter, for the logical clock. Consequently, the counter thereby provides a monotonically increasing sequence which can be used to coordinate the above-described events, i.e. the outgoing movements and the incoming movements during one movement step from one node to an adjacent node.

Therefore, according to an embodiment of the invention, the counting provision is configured such that the logical clock of each node advances with each event which has occurred. Here, it is not necessary for each time step, provided with a time stamp, to be of the same length, because the logical clock remains disconnected from physical time.

The method according to an embodiment of the invention provides that the vehicles move such that the two following conditions are met:

1. Successive movement steps of a vehicle have monotonically increasing values for the time stamp. Thus, the value of a first time stamp for a first movement step has a lower value than the second time stamp for a second, subsequent movement step by the same vehicle.

2. The outgoing movement of a first particular vehicle at a participating node has at most the same value of the time stamp as the value of the time stamp for a subsequent incoming movement of a second vehicle. Here however, the time stamp for the outgoing movement of the first vehicle at the participating node can then only have the same value for the time stamp of the successive incoming movement of the second vehicle at the same node if the node can provide the above-described tandem movement for the two vehicles. If this is not the case, the outgoing movement of a first vehicle at the participating node must have a lower value of the time stamp, i.e. it must have an earlier time stamp than the value of the time stamp of the subsequent incoming movement of a second vehicle at the same node.

Thus, the logical clock in each node advances with each event which has taken place, the events in respect of a relevant node taking place in the sequence which is fixed by the time stamp thereof. As already stated, it is not necessary here for each time step which has a particular time stamp to be of the same length. In fact, the method according to the invention ensures that each event, i.e. each outgoing movement from a first participating node and each incoming movement to a second participating node is carried out in the sequence which is partially fixed according to the relative values of the time stamps. This particularly occurs irrespective of a physical time, i.e. a vehicle does not have to fix the passage of time, resulting through the events, in physical units, i.e. in seconds, fractions or multiples thereof.

In fact, the method according to an embodiment of the invention allows a complete uncoupling of the course of events, fixed by the time stamps, in the material flow system, which can also be called logical time, from an external physical time predetermined by physical courses. In this way, it is possible to avoid the necessary coordination effort, which is otherwise particularly complex, between the logical time in the material flow system and the physical time outside the material flow system. The material flow system, operating with the method according to the invention almost itself defines its internal discrete logical time which controls the events inside the material flow system, regardless of an externally prevailing physical time.

In a particularly preferred embodiment of the method according to the invention, as soon as a vehicle intends to travel along a material flow path, a reservation process takes place for the particular vehicle for the entire material flow path from the starting node to the target node, before the movement of the vehicle along the material flow path can be carried out in a process of individual movement steps, upon completion of the reservation process. The reservation request is received by all the vehicles which also confirm receipt of said reservation request. For this purpose, the reservation requests from all the participating vehicles are forwarded by all the participating vehicles. However, the reservation of the material flow path can be cancelled and can then be replaced by an alternative (re-calculated) reservation of the material flow path, so that it is possible to take into consideration any error sources which may arise in the material flow system, for example due to the failure of a node or due to a breakdown of a vehicle at a particular node, or if two or more vehicles obstruct each other's movement.

A reservation of the material flow path becomes valid when all the vehicles involved in the material flow system have received the reservation proposal from a vehicle and have confirmed it. Likewise, the reservation of the material flow path becomes valid when the reservation of the material flow path of the vehicle has the lowest time stamp for the movement step to the target node. As soon as the reservation has become valid in the above-described manner, the vehicle can start to move. Accordingly, the vehicle can only start to move after the entire material flow path, from the starting node to the target node, has been reserved for the vehicle.

In a particularly preferred embodiment, the nodes which are involved can be reserved for the vehicle which is intended to move for the individual movement steps in that, for each movement step, a value is reserved for the time stamp of the movement step. Here, the lowest value in each case is reserved for the time stamp, which value on the one hand exceeds the value of the last reserved time stamp for a previous movement and for which, on the other hand, there is still no reservation for the nodes involved in this movement step. By virtue of the first condition that the respectively lowest value which has not yet been assigned is reserved for the time stamp, the sequence of the individual movements for the vehicle can be fixed in this manner. By virtue of the second condition that only one value is reserved for the time stamp for which the nodes involved in this movement step have still not assigned any other reservation, it is ensured that a collision cannot take place between two vehicles, the material flow path of which runs across the same nodes. In this way, a node with time stamps is reserved for the incoming movement and for the outgoing movement only for time stamps for the values of which and for all values in-between there is still no reservation.

The logical clock which is present in the participating node and which also has a value can ensure that no reservation is made which is in the past with regard to the logical clock of this node. This advantageous condition reflects the partial order, introduced into the control of the material flow system by the method according to the invention, of the sequence of the individual movements of the vehicles. However, it can be advantageous if the vehicle does not investigate just a single material flow path and, by a subsequent evaluation, selects one of the possible material flow paths through the material flow system. Here, the evaluation can advantageously include how many nodes a particular material flow path comprises and whether a waiting time occurs along the path at one of the nodes and whether the waiting time can be shortened, if appropriate, by moving forward the value of the logical clock of the associated node.

The term "waiting time" at one of the nodes can be understood as meaning a time frame in which the logical clock of the participating node increases although the vehicle remains at the node, without an outgoing movement to an adjacent node or to a neighbouring node taking place within the relevant time frame. This shows that in considering the waiting times, a particular material flow path can be given a different evaluation.

Due to the order which is, however, only partly present in the material flow system, it can happen that a vacant space can appear between a lowest value for the time stamp of an incoming movement at a node and the higher value for the logical clock of the relevant node, the participating node not having any further reservations within the vacant space. In this case, the time stamp of the relevant event can be set at the value of the logical clock of the associated node, this vacant space not being included in the evaluation as waiting time.

As already mentioned, it can be particularly advantageous if the method for the movement of a vehicle, which method comprises the implementation of all the movement steps from the starting node to the target node, can be carried out as soon as possible after receiving the reservation confirmation. Here, the movement of the vehicles can preferably be carried out such that the movement step which has the lowest value for the time stamp is carried out first in each case. The above-mentioned relationship between the value of the time stamp and an associated monotonic sequence can ensure that the vehicle moves in the reserved sequence in the material flow system. This is significant insofar as a plurality of vehicles moves at the same time in the material flow system, as is usual in practice. A movement of the particular vehicle which has actually taken place along the reserved material flow path can increase the logical clock of the participating nodes in each case to the value of the time stamp for the movement step which has actually been carried out. In this way, the logical time of the nodes in the material flow system can be adapted according to the sequence of the movement steps which have already been performed and in this way can allow further movement steps for further vehicles. The vehicles only perform the movement step at a participating node when a movement step is not provided beforehand for a further vehicle, i.e. with a lower value for the time stamp. The method according to the invention makes it possible, due to all the reservation processes for all vehicles, for a partial sequence of all movement steps to be fixed on the entire material flow system. As already mentioned, the sequence of all movement steps is only partial because a sequence of the movement steps is preferably only fixed where the material flow paths of a plurality of vehicles intersect one another.

In the movement process which preferably follows the reservation process, the movement steps are then carried out according to the fixed partial sequence. For this purpose, before each individual movement step from a first node to a second node, a vehicle can communicate with at least one further vehicle which has reserved a time stamp for the previous outgoing movement away from the second node, in order to obtain clearance for the incoming movement step. This communication can also be used to be able to consider error sources which may possibly arise in the material flow system, for example due to the failure of a node or to the breakdown of a vehicle at a node. In this way, a sequence is established for the movements of the individual vehicles, the observance of which requires an autonomous communication between the individual vehicles of the material flow system. After the reservation has been confirmed, the vehicle moves on the material flow path, and all participating vehicles, all valid material flow paths and material flow paths which are to be reserved communicate autonomously among one another and interact accordingly.

The method according to an embodiment of the invention can particularly increase the performance and robustness of the control of a material flow system having bidirectionally used and closely networked material flow paths (carriageways) consisting of nodes and the interconnection thereof for the movement of vehicles. In particular, the method according to the invention makes it possible to already rule out "deadlocks" in the reservation process and in the subsequent movement process of a vehicle. Here, waiting times can also be considered in the reservation process. Due to the partial order, introduced by the logical time, of the individual movement steps, the method according to the invention is robust in respect of variations in the movement time, actually occurring in the relevant material flow system, for a particular vehicle along a specific material flow path. Furthermore, the method according to the invention can allow a possible inclusion of tandem movements. The autonomous communication of the individual vehicles in the material flow system has a manageable communication effort between all the vehicles at the end of the reservation process and a limited communication effort between individual vehicles during the movement process. According to the invention, the interaction of the vehicles is no longer tied to physical time, as a result of which the communication effort can be greatly reduced and a susceptibility to failure due to stochastic influences on the provided passages of time no longer applies.

According to an embodiment of the invention, the vehicles of the entire material flow system interact instead on the basis of logical time which uses the event structure of the movement of the vehicles across the nodes of the material flow system. For this purpose, it is sufficient if the interaction of the vehicles in the material flow system is restricted to those vehicles for whose movement steps the same nodes are used, as a result of which the communication effort is considerably reduced particularly during the movement process.

FIGS. 1 to 4 respectively schematically show a particular aspect of methods according to embodiments of the invention for controlling a material flow system 110. In all these embodiments, the material flow system 110 has nodes 112 which are each configured for a movement of vehicles 114.

FIG. 1 schematically shows, in steps a) to c), a first embodiment of a reservation process. In order to make reservations, the vehicle 114 selects a material flow path from a plurality of possible material flow paths, based on the topology of the material flow system 110 which is present in the form of an adjacency matrix, and on the basis of the valid reservations of all participating vehicles 114. In this embodiment, the starting nodes and target nodes of the vehicles 114 are arranged so that a tandem movement is not appropriate.

FIG. 1a) shows by way of example a first material flow path 116 for a first vehicle 118 which is to move from a first starting node 120 to a first target node 122. Vehicle 118 communicates the material flow path 116, which is to be reserved, to all participating vehicles. Receipt of the reservation proposal is confirmed by all participating vehicles because the value of the time stamp at the target node of the material flow path 116 to be reserved was the lowest. The first material flow path 116 has available three movement steps, each of the three movement steps being provided with a time stamp, here "1", "2" and "3."

The first movement step for which the first time stamp "1" was reserved leads from the first starting node 120 to a first neighbouring node 124 and comprises both an outgoing movement of the first vehicle 118 from the first starting node 120 and an incoming movement to the first neighbouring node 124.

The movement step with time stamp "2" from the first neighbouring node 124 to the second neighbouring node 126 takes place analogously and thereby comprises an outgoing movement from the first neighbouring node 124 and an incoming movement to the second neighbouring node 126. Likewise, the third movement step with time stamp "3" analogously comprises the movement of the vehicle 118 from the second neighbouring node 126 to the first target node 122 and thus has an outgoing movement from the second neighbouring node 126 and an incoming movement to the first target node 122. In the present embodiments, a natural number 1, 2, 3 . . . has been chosen for the value of the time stamp of each movement step. However, instead of this, it is also quite possible to use any other numerical sequence, provided that it has monotonically increasing sequential elements. As already mentioned, it is not important here whether the chosen numbers belong to the decimal system, to the hexadecimal system or to another number system. What is important is that the reservation for the first material flow path 116, as shown in FIG. 1a), for successive movement steps has monotonically increasing values for the time stamp.

The choice of the values, shown in FIG. 1a), for the time stamp of the first material flow path 116 ensures that, for the first vehicle 118, the respective outgoing movement in each of the nodes to be traversed in the sequence 120, 124, 126, 122 has a higher value of the time stamp than the respective incoming movement to these nodes. Furthermore, in FIG. 1b), a second vehicle 128 which is in a second starting node 130, attempts to reserve a second material flow path 132 to a second target node 134.

Figure 1B:
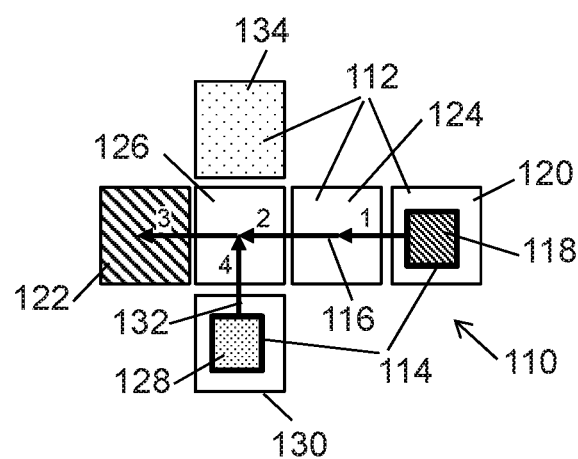

FIG. 1b) schematically shows that due to the material flow path 116 reserved by the first vehicle 118, the movement step from the starting node 130 to the second neighbouring node 126 is possible at the earliest for time stamp "4". Time stamp "1" is omitted here because a tandem movement is not possible in this situation and consequently, time stamp "2" is already reserved for the incoming movement of the first vehicle 118 to the second neighbouring node 126.

Figure 1C:
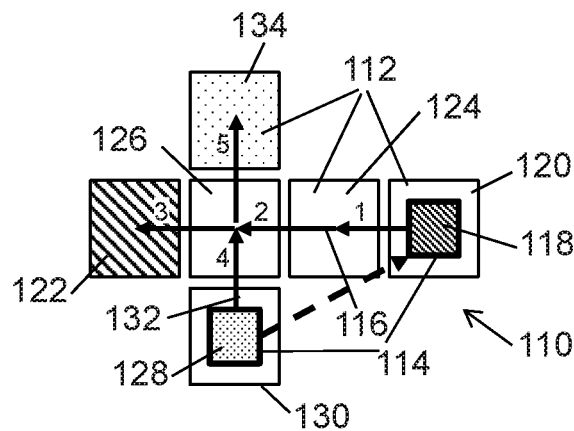

As schematically shown in FIG. 1c), vehicle 118 selects for the movement step from the second neighbouring node 126 to the target node 134 the time stamp "5" and communicates the reservation proposal of the second material flow path 132 to all other participating vehicles and obtains validity by the conditions which have already been mentioned above.

The second material flow path 132 comprises two movement steps, namely the first movement step with time stamp "4" having an outgoing movement from the second starting node 130 and an incoming movement to the second neighbouring node 126 as well as the movement step with time stamp "5" having an outgoing movement from the second neighbouring node 126 and an incoming movement to the second target node 134.

FIG. 2 schematically shows the movement process for the vehicles 114 across the nodes 112 of the material flow system 110 according to the reservations from the first embodiment in FIG. 1. The vehicles 114 move according to the reservation, shown schematically in FIG. 1, for the material flow paths 116, 132, each movement step of the vehicles 114 being made in the sequence of the time stamps thereof.

According to FIG. 2a), the first vehicle 118 is initially on the first starting node 120, while the second vehicle 128 is arranged on the second starting node 130.

FIG. 2b) shows how the second vehicle 128 asks the first vehicle 118 whether it gives clearance for the movement step of the second vehicle 128 with time stamp "4". Clearance requests are only required for incoming movements to nodes for which there is at least one valid reservation by a further participating vehicle with a lower value for the time stamp. However, the first vehicle 118 does not give clearance to the second vehicle 128, because it must first make its own reservation regarding the second neighbouring node 126 with time stamp "2" for the incoming movement and with time stamp "3" for the outgoing movement, based on the counting provision for the value of the logical clock of the second neighbouring node 126. Since clearance has not been given, the second vehicle 128 remains in a waiting mode until, as schematically shown in FIG. 2f), it receives information from the first vehicle 118 that the value of the logical clock of the second neighbouring node 126 has now been set at value "4" based on the counting provision.

Consequently, according to FIG. 2c), only the first vehicle 118 with time stamp "1" moves from the first starting node 120 to the first neighbouring node 124. Analogously, according to FIG. 2d), only the first vehicle 118 with time stamp "2" moves from the first neighbouring node 124 to the second neighbouring node 126. Likewise, according to FIG. 2e), with time stamp "3" only the first vehicle 118 moves from the second neighbouring node 126 to the first target node 122. As schematically shown in FIG. 2f), with time stamp "3", the first vehicle 118 has arrived at the target node 122 and has thus reached its destination. Thereupon, the first vehicle 118 then informs the second vehicle 128 that an incoming movement, with time stamp "4", of the second vehicle 128 to the second neighbouring node 126 from the second starting node 130 is possible. This movement step with time stamp "4" takes place in FIG. 2g), as shown schematically. The final movement of the second vehicle 128 from the second neighbouring node 126 to the second target node 134 is shown schematically in FIG. 2h). Thus, at the end of the movement with time stamp "5", the two vehicles 118, 128 have moved from their respective starting nodes 120, 130 to their respective target nodes 122, 134, without colliding. Instead, the time stamps assigned by the control system has allowed a partial fixing of the sequence of movement of the vehicles 114 in the material flow system 110 in which the nodes 112 of the material flow system 110 were respectively available. The logical clocks of the nodes remain in the time stamp of the movement step which was carried out last in each case.

FIGS. 3 and 4 schematically show a second embodiment of the method according to the invention for controlling the material flow system 110, in which tandem movements 136 are appropriate due to the arrangement of the nodes 112. FIG. 3 schematically shows the reservation of a material flow path.

Figure 3A:
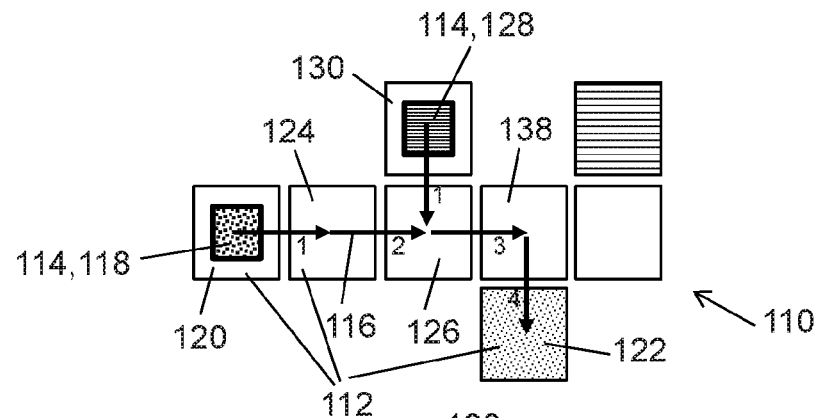
FIGS. 3a-3d show a schematic view of a second reservation process in a method according to an embodiment of the invention for controlling a material flow system.

According to FIG. 3a), the first material flow path 116 was already reserved for the first vehicle 118, starting from the first starting node 120 via the neighbouring nodes in the sequence 124, 126, 138 to the second target node 122 for the time stamps of values "1" to "4", i.e. the reservation of the material flow path 116 was validated.

Figure 3B:
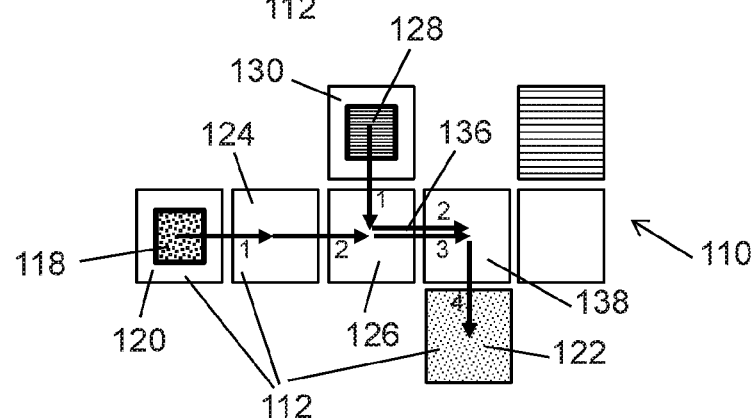
Figure 3C:
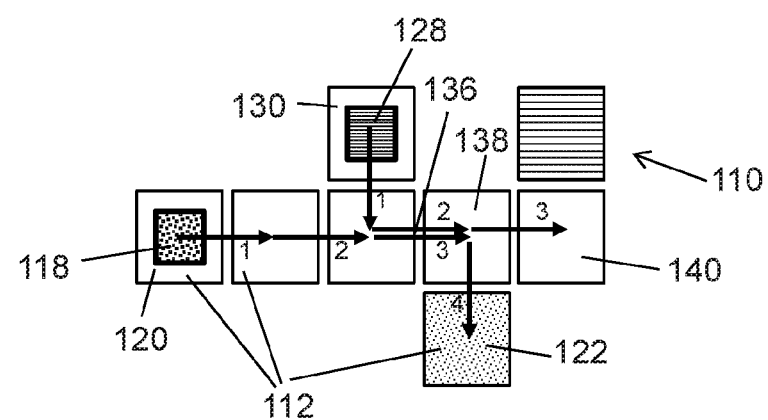
Figure 3D:
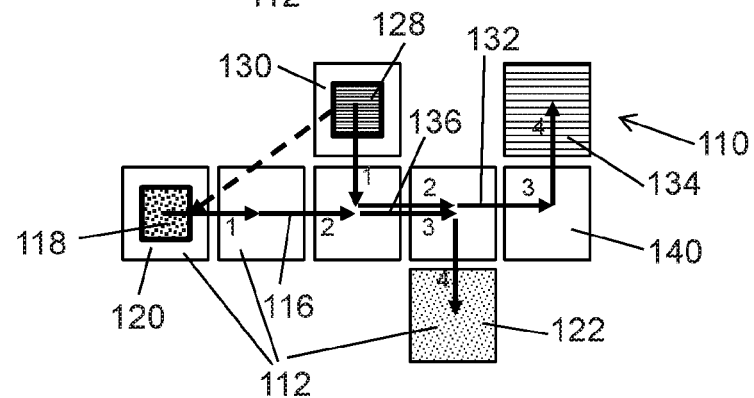

Since the vehicles 118 and 128 are to move in the same direction, the second neighbouring node 126 can be reserved for the movement step with time stamp "1" because, as schematically shown in FIG. 3b), the tandem movement 136 can take place such that an outgoing movement from the second neighbouring node 126 to a third neighbouring node 138 and an incoming movement from the first neighbouring node 124 to the second neighbouring node 126 can take place at the same time for the second neighbouring node 126 with time stamp "2". As a result, as schematically shown in FIG. 3c), a fourth neighbouring node 140 can be reserved for an incoming movement from the third neighbouring node 138 with time stamp "3". Thus, as schematically shown in FIG. 3d), the first material flow path 116 from the first starting node 120 to the first target node 122 can be selected for the first particular vehicle 118 and the second material flow path 132 from the second starting node 130 to the second target node 134 can be selected for the second particular vehicle 128 with the time stamp values of "1" to "4". Here, the use of the tandem movements 136 allows a considerably faster movement of the two vehicles 118, 128. The second vehicle 128 communicates the selected material flow path 132 to all the other vehicles and waits until the reservation of the proposed material flow path 132 has been validated.

Finally, FIG. 4 shows the implementation of the movement process for the material flow system 110 according to the reservations from the second embodiment in FIG. 3 which contain tandem movements 136. FIG. 4a) schematically shows that both vehicles 118, 128 carry out the first movement step in each case. Since neither the first neighbouring node 124 nor the second neighbouring node 126 has a reservation with a lower time stamp than value "1", clearance did not have to be given for these movement steps. At the same time, the first vehicle 118 requests the second vehicle 128 for the clearance of the movement step from the first neighbouring node 124 to the second neighbouring node 126 with time stamp "1".

As schematically shown in FIG. 4b), the second vehicle 128 grants clearance to the first vehicle 118 as soon as it has completed the movement step from the second starting node 130 to the second neighbouring node 126 and the value of the logical clock of the second neighbouring node 126 has been set at 2.

FIG. 4c) schematically shows an example of the tandem movement 136. With time stamp "2", the first vehicle 118 moves from the first neighbouring node 124 to the second neighbouring node 126 and the second vehicle 128 moves from the second neighbouring node 126 to the third neighbouring node 138. Here, the tandem movement 136 identifies the fact that an outgoing movement can be carried out by the second vehicle 128 and an incoming movement can be carried out by the first vehicle 118 at the same time at the second neighbouring node 126 with time stamp "2". A further tandem movement 136 is shown schematically in FIG. 4d). Here, with time stamp "3", an outgoing movement is made by the second vehicle 128 from the third neighbouring node 138 and an incoming movement is made by the first vehicle 118 to the third neighbouring node 138.

Finally, FIG. 4e) shows how the two vehicles 118, 128 reach their respective target nodes 122, 134, as a result of which the intended movement procedure has been completed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 110 material flow system
112 node
114 vehicle
116 first material flow path
118 first vehicle
120 first starting node
122 first target node
124 first neighbouring node
126 second neighbouring node
128 second vehicle
130 second starting node
132 second material flow path
134 second target node
136 tandem movement
138 third neighbouring node
140 fourth neighbouring node

The invention claimed is:

1. A method for controlling a material flow system, wherein the material flow system includes vehicles for transporting goods packages, wherein the vehicles communicate autonomously among one another in the material flow system, wherein the vehicles moves by movement steps along a material flow path from a starting node to a target node, wherein each movement step of a vehicle comprises movement from a first node to a second node, and wherein a logical clock is associated with each node, the method comprising:

providing each movement step of a first vehicle with a time stamp; and carry out movement steps such that for the first vehicle, successive movement steps assume monotonically increasing values for the time stamp and such that for each node that is traversed, an outgoing movement step of the first vehicle has a value of the time stamp which is less than or equal to a value of the time stamp for a subsequently incoming movement step of a second vehicle.

2. The method according to claim 1, wherein the vehicles move such that for each node which is traversed, the outgoing movement step of the first vehicle only has the same value for the time stamp as the value for the time stamp for a subsequently incoming movement step of the second vehicle if the first and second vehicles do not obstruct one another in their movement from or to the respective node.

3. The method according to claim 1, wherein for the vehicle, a reservation of the nodes to be traversed is made for the movement steps, in that reserved for a movement step is the lowest value in each case for the time stamp, which value exceeds the value of the logical clock of the node and this value of the time stamp has not yet already been reserved for a further vehicle at the node participating in this movement step.

4. The method according to claim 1, wherein the material flow path to be reserved of the vehicle is selected by an assessment, the assessment also considering the number of nodes to be traversed, and whether a waiting time occurs at at least one of the nodes and whether the waiting time can be shortened by moving forward the value of the logical clock of the node.

5. The method according to claim 1, wherein the vehicle moves after the material flow path from the starting node to the target node has been reserved for the vehicle.

6. The method according to claim 1, wherein the reservation of the material flow path can be cancelled and can be replaced by an alternative reservation of the material flow path.

7. The method according to claim 1, wherein the vehicles move such that the movement step which has a lower value for the time stamp in respect of the nodes to be traversed is carried out first of all.

8. The method according to claim 1, wherein a logical clock is associated with each node, wherein a movement step completed by the vehicle means that the logical clock of the participating node is set to the value of the time stamp of the completed movement step, whereupon a movement step is carried out only by the vehicle which has a lowest value for the time stamp which is higher than the value of the logical clock of the participating node.

9. The method according to claim 1, wherein the reservation of a material flow path of a vehicle is communicated to all the other participating vehicles and is only validated upon confirmation of receipt.

10. The method according to claim 9, wherein the vehicle with a lowest value of the time stamp of the movement step to the target node receives the sole validation of the reservation of a material flow path.

* * * * *